J. A. HORNE.
RESILIENT TIRE.
APPLICATION FILED FEB. 18, 1919.
1,347,953.
Patented July 27, 1920.
2 SHEETS—SHEET 1.
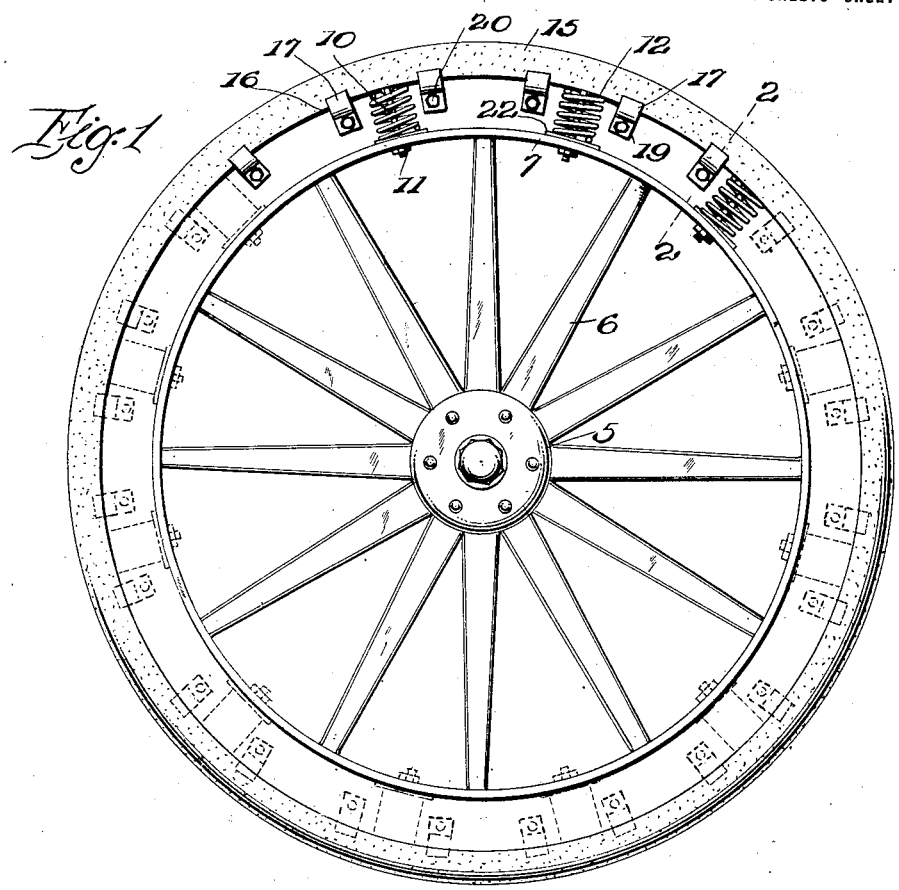
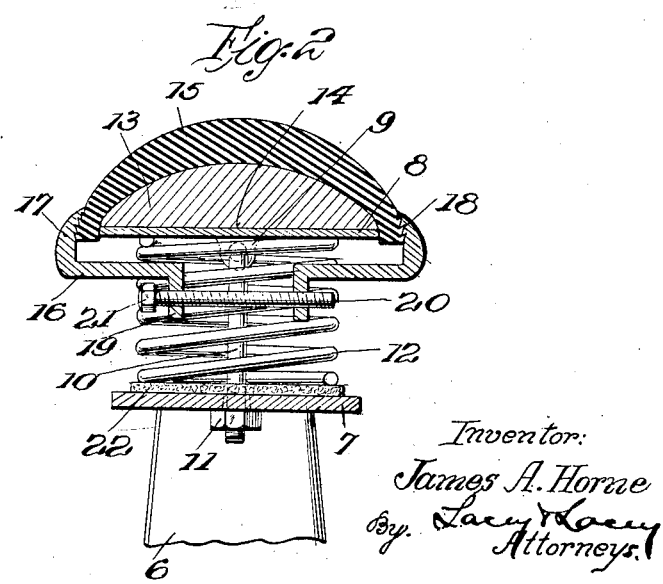
Inventor:
James A. Horne
By Lacey & Lacey
Attorneys.

J. A. HORNE.
RESILIENT TIRE.
APPLICATION FILED FEB. 18, 1919.
1,347,953.
Patented July 27, 1920.
2 SHEETS—SHEET 2.
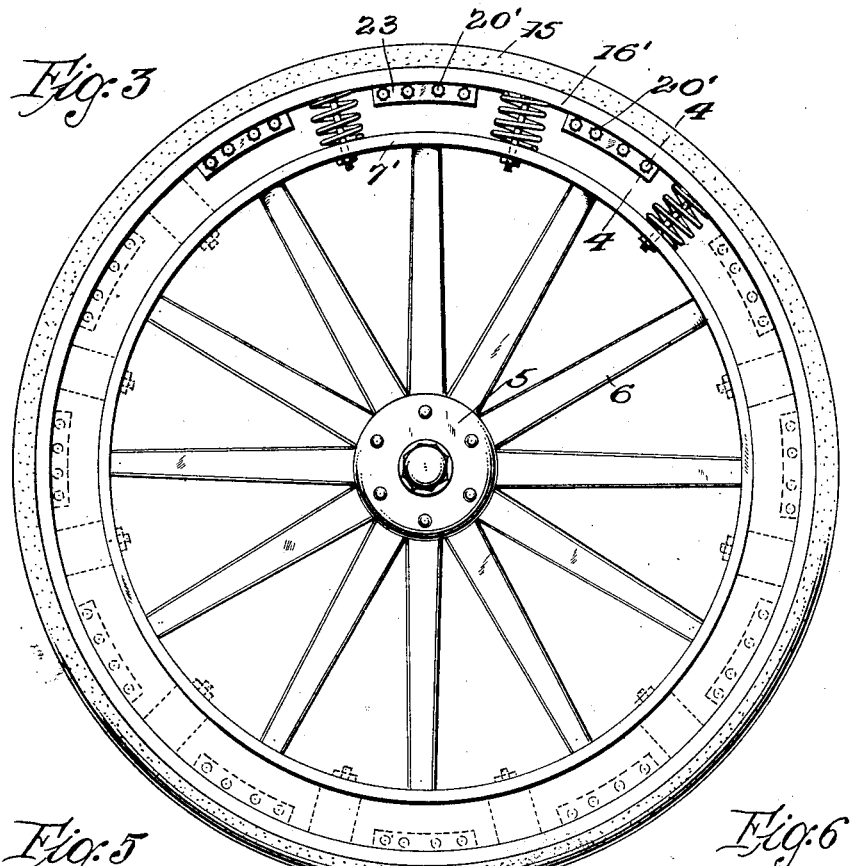
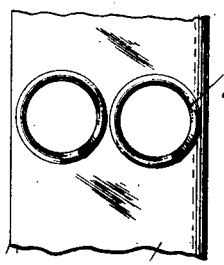
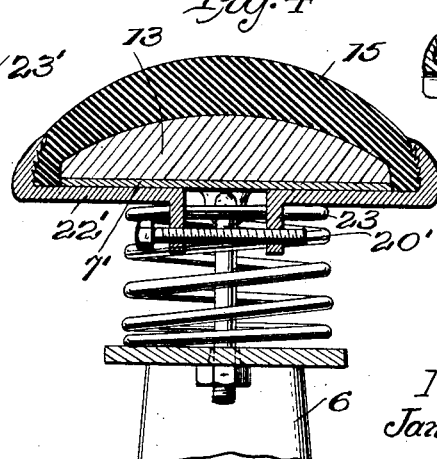
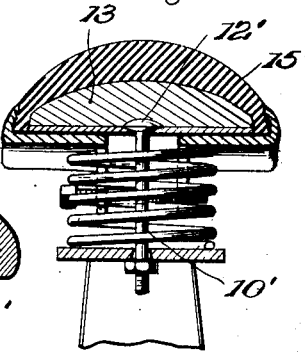
Inventor:
James A. Horne

UNITED STATES PATENT OFFICE.

JAMES A. HORNE, OF NEWARK, NEW JERSEY.

RESILIENT TIRE.

1,347,953. Specification of Letters Patent. Patented July 27, 1920.

Application filed February 18, 1919. Serial No. 277,762.

*To all whom it may concern:*

Be it known that I, JAMES A. HORNE, a citizen of the United States, residing at Newark, in the county of Essex and State of New Jersey, have invented certain new and useful Improvements in Resilient Tires, of which the following is a specification.

This invention relates to resilient tires for automobiles and other vehicle wheels.

The object of the invention is to provide a resilient tire of simple and durable construction which will insure comfort in riding without liability of puncture and the resultant delay and annoyance incident to effecting repairs thereto.

The invention further contemplates novel means for retaining the shoe or casing of the tire in position on the rim and means interposed between the rim and casing for cushioning the latter and retaining the casing in its proper shape.

The invention further aims to provide a resilient tire including sectional clamping members having their outer ends roughened for engagement with the tire casing and their inner ends provided with depending perforated ears for the reception of clamping bolts or screws so that by tightening said bolts the casing and its associated parts may be effectually retained in position on the rim.

A still further object of the invention is generally to improve this class of devices so as to increase their utility, durability and efficiency.

Figure 1 is a side elevation of a resilient tire embodying the present invention;

Fig. 2 is a transverse sectional view taken on the line 2—2 of Fig. 1;

Fig. 3 is a side elevation illustrating a modified form of the invention;

Fig. 4 is transverse sectional view taken on the line 4—4 of Fig. 3;

Fig. 5 is a top plan view partly in section illustrating a slightly different arrangement of the coiled springs;

Fig. 6 is a transverse sectional view showing a different manner of attaching the bolts to the rim.

Corresponding and like parts are referred to in the following description and indicated in all the views of the drawings by the same reference characters.

The resilient tire forming the subject-matter of the present invention may be applied to automobile or other vehicle wheels and by way of illustration is shown in connection with an automobile wheel of the ordinary construction in which 5 designates the hub, 6 the spokes and 7 the felly, the latter being preferably formed of metal, as shown.

Spaced from the felly 7 is a rim 8 also preferably formed of metal and provided at spaced intervals on its inner circumference with depending eyes 9 to which are pivotally connected the adjacent ends of securing bolts, indicated at 10. The outer ends of the bolts 10 are bent to form eyes which engage the eyes 9, while the inner ends of said bolts extend through the felly 7 for engagement with clamping nuts 11. Interposed between the felly 7 and the rim 8 is a plurality of coiled springs 12 which serve to yieldably support the rim 8 and its associated parts in spaced relation to said felly. Any desired number of coiled springs may be provided but it is preferred to employ one of said springs between each pair of spokes with the convolutions of the springs surrounding the adjacent bolts 10, as best shown in Fig. 1 of the drawings.

Resting on the rim 8 is a combined filling and cushioning member 13, said member being preferably formed of wood and having its lower face 14 transversely flat for contact with the adjacent surface of the rim 8 and its outer face transversely curved to conform to the curvature of the tire casing or shoe 15. The casing 15 may be formed of rubber or other suitable material and is preferably of sufficient width to bear against the adjacent side edges of the rim 8 and thus completely house and protect the cushioning member 13.

As a means for securing the tire casing 15 in position on the rim there is provided a plurality of clamping members each including mating sections 16 having their outer ends provided with angularly disposed gripping portions or lips 17, the inner faces of which are serrated or otherwise roughened, as indicated at 18, for engagement with the outer surface of the casing 15, the inner ends of the sections 16 being provided with depending ears 19 having proper perforations formed therein to permit the passage of a screw or bolt 20; and when this is tightened the sections 16 of the clamping member may be caused to grip the casing 15 and securely hold said casing in position on the rim. Two of the clamping members are preferably arranged between each pair of coiled springs, although, if desired, a greater or less number may be employed.

In order to assist in preventing lateral displacement of the coiled springs 12 with respect to the felly 7, a strip of felt or other yieldable material 22 is preferably placed on the felly around each bolt 10 and on which the lower convolutions of the springs rest, as best shown in Fig. 2 of the drawings. If desired similar strips of yieldable material may be positioned on the inner face of the rim 8 to prevent accidental displacement of the outer ends of the springs.

In Figs. 3 and 4 of the drawings, there is illustrated a modified form of the invention in which a single clamping member is employed, said clamping member being formed of mating sections 22', one of which extends continuously around one side of the wheel and the other continuously around the opposite side of the wheel and both closely underlie the rim 7' thereof. In this form of the device each section has a continuous gripping portion or annular lip 16' and is provided at intervals with relatively long angularly disposed plates or ears 23 having threaded openings formed therein to permit the passage of securing screws or bolts 20', the construction and operation of this form of the device being otherwise similar to that shown in Fig. 1 of the drawings excepting that the outer ends of the springs now bear against the sections 22' instead of directly against the rim.

If desired instead of having a single coiled spring between each pair of spokes of the wheel a pair of said springs may be located between each pair of spokes and arranged side by side, as indicated at 23', in Fig. 5 of the drawings.

In Fig. 6 there is illustrated a modified form of the invention in which the bolts 10' are provided with enlarged heads 12', the upper convex faces of which are countersunk in the adjacent surface of the filling member while the lower convex faces of the bolts are fitted in correspondingly shaped seats in the rim of the wheel, as shown. This form of bolt may be used, if desired, on the rim of the wheel shown in either Fig. 1 or Fig. 3 of the drawings without departing from the spirit of the invention.

It will thus be seen that the member 13 not only acts as a filler for the tire casing 15 but also serves as a cushioning member and as the outer surface of the cushioning member is curved transversely said cushioning member will retain the casing in proper shape at all times. It will, furthermore, be noted that inasmuch as the clamping members grip the casing at opposite points on the rim 8 both the cushioning member 13 and casing 15 are securely held against lateral displacement on said rim. Should the tire casing 15 become worn or otherwise impaired from constant use, the latter may be readily removed from the wheel by loosening the screws 20 as will be readily understood.

The resilient tire may be made in different sizes to accommodate different sizes or types of wheels and as many coiled springs may be employed as are found necessary to properly sustain the weight of the wheel to which they are applied.

Having thus described the invention, what is claimed as new is:

1. The combination with a wheel including a felly, of a rim yieldably supported in spaced relation to the felly, a cushioning member resting on the rim, a tire casing covering the cushioning member, a clamping member engaging the tire casing, and means for adjusting said clamping member to grip the casing and prevent displacement of the cushioning member.

2. The combination with a wheel including a felly, of a rim yieldably supported in spaced relation to the felly, a combined cushioning and filling member resting on the rim, a tire casing bearing against the outer surface of the cushioning member, a sectional clamping member having roughened portions for engagement with the tire casing, and screws connecting the sections of the clamping member for actuating the latter to grip the casing.

3. The combination with a wheel including a felly, of a rim yieldably supported in spaced relation to the felly, a cushioning member resting on the rim, a tire casing completely housing the cushioning member and bearing against the rim, a clamping member formed of mating sections having their outer portions provided with angular extensions, the inner faces of which are roughened for engagement with the tire casing and their inner portions provided with depending perforated ears, and adjusting screws extending through the perforations of said ears for drawing the sections of the clamping member together to grip the casing on the rim.

4. The combination with a wheel including a felly, of a rim yieldably supported in spaced relation to the felly, bolts pivotally connected with the rim and extending through openings in the felly of the wheel, coiled springs surrounding the bolts and interposed between the felly and rim, a casing carried by the rim, and clamping means engaging the casing between adjacent springs for holding it on the rim.

5. The combination with a wheel including a felly, of a rim spaced from the felly, strips of yieldable material resting on the outer surface of the felly, bolts connected with the rim and extending through openings in the felly, coiled springs surrounding the bolts and bearing against the adjacent strips of yieldable material, a tire casing, and means for clamping the tire casing in position on the rim.

6. The combination with a wheel including a felly, of a rim spaced from the felly, coiled springs interposed between the rim and felly, a combined filling and cushioning member resting on the rim and having its outer surface curved transversely, a tire casing having its intermediate portion bearing against the curved surface of the cushioning member and its opposite edges bearing against the adjacent longitudinal edges of the rim, a sectional clamping member engaging the opposite side edges of the tire casing, and means connecting the sections of the clamping member for drawing the same together to grip the tire casing.

7. The combination with a wheel including pairs of spokes and a felly, of a rim spaced from the felly, a coiled spring interposed between the rim and felly between the spokes of each pair, a combined cushioning and filling member resting on the rim, a tire casing engaging the combined filling and cushioning member, a clamping device formed of mating sections having angularly disposed outer portions engaging the tire casing and angularly disposed ears and clamping bolts extending through the ears of said sections for actuating the clamping device to grip the tire casing.

In testimony whereof I affix my signature.

JAMES A. HORNE. [L. S.]